United States Patent [19]

Anton

[11] Patent Number: 4,543,272

[45] Date of Patent: Sep. 24, 1985

[54] INSULATION PROCESS BY IMPREGNATION OF ELECTRIC LEADS

[75] Inventor: Alain Anton, Chaponnay, France

[73] Assignee: Alsthom-Atlantique, S.A., Paris Cedex, France

[21] Appl. No.: 635,094

[22] Filed: Jul. 27, 1984

[30] Foreign Application Priority Data

Aug. 3, 1983 [FR] France ............................. 83 12807

[51] Int. Cl.$^4$ ............................................ B05D 5/12
[52] U.S. Cl. ...................... 427/58; 427/116; 427/386; 427/388.2; 427/389.7; 29/592 R
[58] Field of Search ............. 427/58, 116, 386, 388.2, 427/389.7; 29/592 R

[56] References Cited

U.S. PATENT DOCUMENTS

| | | | |
|---|---|---|---|
| 3,020,262 | 2/1962 | Speranza | 260/47 |
| 3,313,747 | 4/1967 | Schramm | 260/2.5 |
| 3,334,110 | 8/1967 | Schramm | 260/307 |
| 3,778,536 | 12/1973 | Smearing | 427/116 |
| 3,876,618 | 4/1975 | Clarke | 260/47 EP |
| 4,356,417 | 10/1982 | Smith et al. | 427/116 |

*Primary Examiner*—Richard Bueker
*Attorney, Agent, or Firm*—Kenyon & Kenyon

[57] ABSTRACT

Insulation process by impregnation of electric leads using isocyanate and oxazolidone cycle resins in which a glass cloth and porous mica paper tape is wound around the leads, the tape is impregnated with a quaternary ammonium salt, catalyzing condensation of isocyanate and epoxy derivatives in isocyanurate and oxazolidone cycles and with a varnish comprising a liquid epoxy resin and an isocyanate derivative, then the impregnated tape undergoes a heat treatment for polymerization of the varnish.

As quaternary ammonium salt, is used a benzyltrialkylammonium halide with alkyl chain containing at most 3 carbon atoms, the tape is first impregnated with benzyltrialkylammonium halide and liquid epoxy resin, it is dried at a temperature equal to 135° C. at maximum and then it is impregnated with isocyanate derivative based varnish before undergoing the polymerizing heat treatment.

5 Claims, No Drawings

INSULATION PROCESS BY IMPREGNATION OF ELECTRIC LEADS

The present invention relates to an insulation process by impregnation of electric leads using isocyanurate and oxazolidone cycle resins in which a glass cloth and porous mica paper tape is wound around the leads, the tape is impregnated with a quaternary ammonium salt, catalyzing condensation of isocyanate and epoxy derivatives in isocyanurate and oxazolidone cycles and with a varnish comprising a liquid epoxy resin and an isocyanate derivative, then the impregnated tape undergoes a heat treatment for polymerization of the varnish.

In documents No. FR-A-2207952 and No. 2242419 was proposed manufacturing of an electric winding insulation by condensation of an isocyanate derivative and an epoxy derivative in presence of a catalyzer which favours formation of isocyanurate and oxazolidone cycles; such a catalyzer can be constituted by a quaternary ammonium salt containing a long chain alkyl radical containing at least 8 carbon atoms.

According to document No. FR-A-2427673, it was also proposed: to incorporate a hardening catalyzer for the imidazol group to a mica tape on glass support, impregnated with silicone resin and dried; to impregnate the obtained insulation tape with a varnish constituted by a mixture of isocyanate and epoxy derivatives and then to harden it by heating. However, since the quaternary ammonium salt contain a long-chain alkyl radical, they are very soluble in the tape impregnation resin and therefore they migrate easily from the tape to the impregnation bath and induce a premature varnish viscosity increase during the impregnation stage which is carried out by successive and alternating operations under vacuum and then under pressure entailing thus a more difficult and imperfect impregnations. Besides, the solvent-free resins with isocyanate and epoxy derivative base show progressive viscosity increase during storage and this reduces their possible storage life in casks and tanks.

The present invention is therefore designed to provide: a process to avoid any condensing reaction under the effect of a catalyzer before heating of the impregnation bath, thus to achieve a very low viscosity impregnation resin—this viscosity can remain constant for a very long time—and to ensure easy and homogeneous impregnation of the tape.

According to the invention, the process is characterized by use, as quaternary ammonium salt, a benzyltrialkylammonium halide with alkyl chain containing at most 3 carbon atoms, the tape is first impregnated with benzyltrialkylammonium halide and liquid epoxy resin, it is dried at a temperature equal to 135° C. at maximum and then it is impregnated with isocyanate derivative based varnish before undergoing the polymerizing heat treatment.

In addition, it preferably satisfies with at least one of the following characteristics:

The benzyltrialkylammonium halide is dissolved in the liquid epoxy resin which is then used to impregnate the tape.

The benzyltrialkylammonium halide is the benzyltrimethylammonium chloride or the benzyltriethylammonium chloride.

The proportion of benzyltrialkylammonium halide is of 0.2 to 5% of weight and preferably 0.8 to 1.5% of total varnish weight.

The respective proportion of liquid epoxy resin and isocyanate derivative are such that the epoxy equivalents/isocyanate equivalent ratio in the final impregnation varnish is included between 1/7 and 1/25 and preferably between 1/20 and 1/25.

The tape used is made out of mica paper on which is glued, by means of epoxy powder having a relatively high melting point, one or several glass cloth layers or felt or a polyester or polyamide film.

This tape is preferably overlacquered using an epoxy resin and catalyzer solution. The assembly is then dried under high ventilation at a temperature not exceeding 135° C. so that the catalyzer acts before the heat treatment.

The isocyanate varnish impregnation procedure is known and is carried out by arranging in a tank the leads or the electric winding appliances fitted with tape layers already impregnated with epoxy resin and catalyzer, then by submitting them to successive and alternating vacuum and pressure operations in presence of isocyanate varnish.

For the polymerizing heat treatment, the impregnated leads and impregnated electric winding appliances are placed in an oven where they are brought to sufficient temperature and during sufficient time to allow the condensing reactions to take place. For instance, the impregnated leads and/or impregnated electric winding appliances are placed in an oven and heated up to 130° C. in 1h30. This temperature is maintained during 2 hours. They are then brought to 150° C. during 4 hours. The treatment is completed by a postbaking process during 15 hours at a temperature of 200° C.

The epoxy resins used can be: the bisphenol A or bisphenol F epoxy resins having an epoxy equivalent between 160 and 1800, the novolak epoxy resins having an epoxy equivalent between 160 and 250 the liquid cycloaliphatic epoxy resins such as those which are commercialized by the Company Ciba-Geigy as CY-192 or CY-179.

It is possible to use, as isocyanate derivative, diisocayanates such as the 4-4' diphenylmethane diisocyanate, the 2,4-toluene diisocyanate, the 1,2-butane diisocyanate, the 1,4-butane diisocyanate, the 1,3-propane diisocyanate, etc.

It is also possible to use polyisocyanates having three or more reactive functions such as the triphenylmethane triisocyanate, the 3-3', 4-4' diphenilmethane tetraisocyanate, etc.

Hereunder, are described examples of insulations using impregnation according to the invention. Their electrical properties are grouped in the single following table:

EXAMPLE 1

A tape, made of 150 g/m$^2$ mica paper and 23 g/m$^2$ glass cloth glued by means of epoxy powder, is overlacquered at a rate of 5.46 g/m$^2$ base using resin having the following weight composition:
  novolak epoxy resin (epoxy equivalent: 172): 82.4%
  benzyltrimethylammonium chloride: 17.6%

The tape thus made out is degassed under vacuum and then impregnated with a varnish only made of 4-4'-single technical diphenylmethane diisocyanate.

EXAMPLE 2

The same tape as in example 1 is impregnated with a mixture of:

2,4-toluene diisocyanate: 80% in weight
2,6-toluene diisocyanate: 20% in weight

EXAMPLE 3

A tape identical to example 1, but overlacquered with resin having the following weight composition:
bisphenol A epoxy resin (epoxy equivalent: 178): 27.4%
novolak epoxy resin (epoxy equivalent: 172): 55%
benzyltrimethylammonium chloride: 17.6%

The tape is impregnated with 4,4'-diphenylmethane diisocyanate

EXAMPLE 4

The same tape as in example 3 is impregnated with a mixture
2,4-toluene diisocyanate: 80% in weight
2,6-toluene diisocyanate: 20% in weight The loss constants and the dielectric constants of the obtained insulations are grouped in the table hereunder:

|  | tg$\delta$ at 200° C. under 1.2 KV initial power | tg$\delta$ at 230° C. under 1.2 KV initial power | Dielectric constant $\epsilon$ | | tg$\delta$ 200° C. under 1.2 KV initial power |
|---|---|---|---|---|---|
|  |  |  | at 200° C. under 1.2 KV initial power | 230° C. under 1.2 KV initial power |  |
| Example 1 | 0.083 | 0.16 | 4.2 | 4.8 | 0.069 |
| Example 2 | 0.097 | 0.19 | 4.5 | 5.0 | 0.088 |
| Example 3 | 0.092 | 0.18 | 4.3 | 4.9 | 0.075 |
| Example 4 | 0.098 | 0.20 | 4.3 | 4.8 | 0.087 |

I claim:

1. Insulation process by impregnation of electric leads using isocyanate and oxazolidone cycle resins in which a glass cloth and porous mica paper tape is wound around the leads, the tape is impregnated with a quaternary ammonium salt, catalyzing condensation of isocyanate and epoxy derivatives in isocyanurate and oxazolidone cycles and with a varnish comprising a liquid epoxy resin and an isocyanate derivative, then the impregnated tape undergoes a heat treatment for polymerization of the varnish, characterized by use, as quaternary ammonium salt, of a benzyltrialkylammonium halide with alkyl chain containing at most 3 carbon atoms, the tape is first impregnated with benzyltrialkylammonium halide and liquid epoxy resin, it is dried at a temperature equal to 135° C. at maximum and then it is impregnated with isocyanate derivative based varnish before undergoing the polymerizing heat treatment.

2. Process according to claim 1, characterized by the fact that the benzyltrialkylammonium halide is dissolved in the liquid epoxy resin which is then used to impregnate the tape.

3. Process according to claim 1, characterized by the fact that the benzyltrialkylammonium halide is the benzyltrimethylammonium chloride or the benzyltriethylammonium chloride.

4. Process according to claim 1, characterized by the fact that the proportion of benzyltrialkylammonium halide is of 0.2 to 5% of weight and preferably 0.8 to 1.5% of total varnish weight.

5. Process according to claim 1, characterized by the fact that the the respective proportion of liquid epoxy resin and isocyanate derivative are such that the epoxy equivalents/isocyanate equivalents ratio in the final impregnation varnish is included between 1/7 and 1/25 and preferably between 1/20 and 1/25.

* * * * *